United States Patent
Terzis et al.

(10) Patent No.: US 10,895,054 B2
(45) Date of Patent: Jan. 19, 2021

(54) GEOTEXTILE

(71) Applicant: ECOLE POLYTECHNIQUE FEDERALE DE LAUSANNE (EPFL), Lausanne (CH)

(72) Inventors: Dimitrios Terzis, Nyon (CH); Lyesse Laloui, Ecublens (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/615,369

(22) PCT Filed: May 30, 2017

(86) PCT No.: PCT/EP2017/062995
§ 371 (c)(1),
(2) Date: Nov. 20, 2019

(87) PCT Pub. No.: WO2018/219431
PCT Pub. Date: Dec. 6, 2018

(65) Prior Publication Data
US 2020/0157757 A1    May 21, 2020

(51) Int. Cl.
*E02D 17/20* (2006.01)
*E02D 3/12* (2006.01)
(Continued)

(52) U.S. Cl.
CPC ............ *E02D 17/202* (2013.01); *E02B 3/122* (2013.01); *E02D 3/12* (2013.01); *A01G 24/44* (2018.02);
(Continued)

(58) Field of Classification Search
CPC .......... E02D 3/00; E02D 3/005; E02D 17/20; E02D 17/202; E02D 31/004;
(Continued)

(56) References Cited

U.S. PATENT DOCUMENTS 3,959,080 A * 5/1976 Orth .................... C08F 8/00
435/179
4,916,937 A * 4/1990 Robertson ............ E02D 31/004
405/129.7
(Continued)

FOREIGN PATENT DOCUMENTS

CA    2991675 A1 *  1/2017 ............... B32B 5/26
FR    2873725 A1    2/2006
(Continued)

OTHER PUBLICATIONS

Al Qabany, A., & Soga, K. Effect of chemical treatment used in MICP on engineering properties of cemented soils. Géotechnique, 63(4), 331. (Mar. 2013).
(Continued)

*Primary Examiner* — Frederick L Lagman
(74) *Attorney, Agent, or Firm* — Maschoff Brennan (57) ABSTRACT

The present invention concerns a geosynthetic element for a geotechnical engineering application. The geosynthetic element comprises: bacteria carriers for carrying bacteria arranged to be propagated from the geosynthetic element to a surrounding geomaterial; and a flow network comprising openings on its surface to allow a reactant to escape the flow network to the surrounding geomaterial along the flow network to produce solid calcium carbonate when in contact with the bacteria. The reactant flow network further comprises a set of inlets for feeding the reactant into the flow network, and a set of outlets for recovering at least a part of the reactant from the reactant flow network.

15 Claims, 4 Drawing Sheets

(51) Int. Cl.
*E02B 3/12* (2006.01)
*A01G 24/44* (2018.01)
*B32B 5/26* (2006.01)
*E02D 17/18* (2006.01)

(52) U.S. Cl.
CPC .......... *B32B 5/26* (2013.01); *D10B 2505/204* (2013.01); *E02D 17/18* (2013.01); *E02D 2300/0084* (2013.01)

(58) Field of Classification Search
CPC ................ E02D 31/006; E02D 31/025; E02D 2300/0084; E02D 2300/0095; E02D 2450/10; E02D 2450/105; E02D 2450/108; E02D 3/12
USPC .......................................... 405/302.7, 302.4
See application file for complete search history.

(56) References Cited

U.S. PATENT DOCUMENTS

| | | | | |
|---|---|---|---|---|
| 5,100,258 | A * | 3/1992 | VanWagoner | E02B 11/00 405/36 |
| 8,210,776 | B2 | 7/2012 | Darson-Balleur et al. | |
| 9,328,473 | B2 | 5/2016 | Esnault et al. | |
| 9,804,607 | B1 * | 10/2017 | Coleman | B23P 11/00 |
| 2003/0031511 | A1 * | 2/2003 | Tyler | B65B 1/04 405/15 |
| 2006/0000767 | A1 * | 1/2006 | Trauger | B09C 1/10 210/503 |
| 2007/0206994 | A1 * | 9/2007 | Olsta | B32B 5/30 405/128.45 |
| 2007/0253785 | A1 * | 11/2007 | Tyler | A01C 14/00 405/302.6 |
| 2008/0298901 | A1 | 12/2008 | Hamelin et al. | |
| 2012/0020745 | A1 * | 1/2012 | Miller | E02D 29/0208 405/284 |
| 2014/0205790 | A1 | 7/2014 | Back et al. | |
| 2014/0377014 | A1 * | 12/2014 | Esnault | E02D 3/12 405/271 |
| 2016/0264463 | A1 | 9/2016 | Dosier et al. | |
| 2016/0362334 | A1 | 12/2016 | Dosier | |

FOREIGN PATENT DOCUMENTS

| | | |
|---|---|---|
| FR | 2911887 A1 | 8/2008 |
| FR | 2985746 A1 | 7/2013 |
| WO | 2006066326 A1 | 6/2006 |
| WO | 2008120979 A1 | 10/2008 |

OTHER PUBLICATIONS

Cheng, L., Cord-Ruwisch, R., & Shahin, M. A. (2013). Cementation of sand soil by microbially induced calcite precipitation at various degrees of saturation. Canadian Geotechnical Journal, 50(1), 81-90.
DeJong JT, et al. Biogeochemical processes and geotechnical applications: progress, opportunities and challenges. Geotechnique. 1;63(4):287. (Mar. 2013).
Gomez MG et al. "Field-scale bio-cementation tests to improve sands." Proceedings of the Institution of Civil Engineers—Ground Improvement. 168(3):206-16. (Aug. 2015).
Harkes, M. et al., "Fixation and distribution of bacterial activity in sand to induce carbonate precipitation for ground reinforcement", Ecological Engineering, vol. 36, Issue 2, pp. 112-117 (Feb. 2010).
Hausinger, R.P. "Biochemistry of Nickel", Springer Science & Business Media, p. 40 (2013).
Mitchell, J.K. & Santamarina, J.K., "Biological considerations in geotechnical engineering", Journal of Geotechnical and Geoenvironmental Engineering, vol. 131, Issue 10, pp. 1222-1233 (Oct. 2005).
Piriyakul, K., & Iamchaturapatr, J. Deep Soil Mixing Method for the Bio-cement by Means of Bender Element Test. In Advances in Laboratory Testing and Modelling of Soils and Shales (pp. 375-381). Springer, Cham. Jan. 2017.

* cited by examiner

GEOTEXTILE

TECHNICAL FIELD

The present invention relates to a geosynthetic element for geotechnical engineering applications. More specifically, the geosynthetic element according to the present invention comprises bacteria carriers for calcifying bacteria and a flow network. The present invention also relates to a method of inducing microbial calcium carbonate precipitation in a geomaterial by using the geosynthetic element.

BACKGROUND OF THE INVENTION

The driving forces behind the conception and implementation of soil reinforcement methods are, on one hand, related to the complexity of foundation or earth stabilisation solutions of modern engineering works. On the other hand, as infrastructures age, there is an increasing need for rehabilitation works and for implementation of tools that allow engineers to strengthen the subsurface. Furthermore, when faced with large-scale infrastructure projects, such as transportation works, engineers are often confronted with inhomogeneous substrates and various soil types. Some of them fail to provide the necessary load-bearing capacity or are susceptible to environmental threats, such as erosion and liquefaction, and thus require extensive strengthening and stabilisation operations.

Existing industrial techniques allow some of the above challenges to be tackled, to some extent, without the use of calcifying bacteria. Such techniques rely on utilisation of artificially manufactured cementitious fluids, pumped into ground under high pressure (jet grouting, cement grouting, microcement grouting) or on the implementation of geosynthetics. Geosynthetic materials are generally composed of polypropylene or other polymeric substances and aim to stabilise soil formations for the construction of embankments and for the protection of slopes or riverbanks against erosion. Eight main product categories are identified: geotextiles, geogrids, geonets, geomembranes, geosynthetic clay liners, geofoams, geocells and geocomposites, all targeting various applications and used with various installation methods.

Microbiologically induced calcium carbonate precipitation (MICP) is a known reactive mechanism that results in the formation and growth of calcium carbonate ($CaCO_3$) particles (also referred to as microbe cement) within the soil matrix. MICP may be used for improving soil stability and its mechanical properties. In known solutions, ureolytic calcifying bacteria have been directly introduced into the soil or other geological formations. Applications of MICP via infiltration, via systems of pumping and extraction wells, or via direct mixing with aggregates are known for consolidating soils. It is also known to use MICP for the production of masonry, for dust control and for the manufacture of some construction materials. MICP is a natural process based on microbial-induced urea hydrolysis (Equation 1). This natural reaction mechanism is catalysed by the enzyme urease found in several bacterial strains. A catalysed urea hydrolysis completes $10^{14}$ times faster compared to a non-catalysed reaction. The available bicarbonate ($CO_3^{2-}$) produced by the urea hydrolysis precipitates into solid calcium carbonate crystals (Equation 2) under the presence of a calcium source, such as calcium chloride.

$$CH_4N_2O + 2H_2O \rightarrow 2NH_4^+ + CO_3^{2-} \quad (1)$$

$$Ca^{2+} + CO_3^{2-} \rightarrow CaCO_3\downarrow \quad (2)$$

For example, FR2873725 and FR2911887 disclose the use of a family of calcifying bacteria, and that of denitrifying bacteria for increasing the resistance of porous materials. In these publications, a method is described for applying MICP by directly feeding soils with calcifying bacteria and reactant solutions. FR2985746 also introduces recirculation of water throughout the different steps of the MICP process, as a means of economising resources and further reducing installation costs. However, direct feeding of soils with bacteria via a single injection well is not always an optimal solution, because it leads to limited calcium carbonate precipitation in the vicinity of the injection source and poor propagation of the calcifying bacteria in the surrounding geomaterial. Thus, heavy feeding equipment and time-consuming repetitions of injections are required to improve larger soil volumes.

SUMMARY OF THE INVENTION

The present invention aims to overcome at least some of the problems identified above related to the use of the MICP in geotechnical engineering applications.

According to a first aspect of the invention, there is provided a geosynthetic element for a geotechnical engineering application for forming solid calcium carbonate in a soil material, the geosynthetic element comprising:
  bacteria carriers comprising calcifying bacteria, the calcifying bacteria being arranged to propagate from the bacteria carriers to a surrounding soil material; and
  a flow network comprising openings on the surface of the flow network to allow a reactant to propagate from the flow network to the surrounding soil material along the flow network to produce solid calcium carbonate, the flow network further comprising a set of inlets for feeding the reactant into the flow network, and a set of outlets for feeding out at least a portion of the reactant from the flow network.

Some of the advantages of the proposed geosynthetic element are the following:
  The proposed geosynthetic element may be implemented, for example, as a solid composite membrane or lattice, a system of expandable fibres or a prefabricated drain. These elements, without the bacterial cells and the circulation network, are known and used for myriads of applications in the field of geotechnical engineering. The proposed new geosynthetic elements offer additional value compared to conventional elements thanks to the means that enable the implementation of MICP for improved mechanical performance of soils. Thus, the geosynthetic element according to the invention is easily reproducible for industrial applications, and the industry is already familiar with similar types of products.
  Designing geosynthetic elements comprising calcifying bacteria and the circulation network makes it possible to apply MICP in a controlled manner. Furthermore, the locations of bacteria cells in the geosynthetic element can be predetermined in the factory or at the installation site, prior to or during the application of bio-cementation. This results in a homogenous final distribution of calcifying bacteria and, eventually, of microbe cement.
  The manufacturing process of the proposed geosynthetic element requires relatively minor adjustments compared to the manufacturing processes of existing geosynthetic elements without the bacteria and the circulation network.

Producing the proposed geosynthetic element in a factory, instead of directly feeding bacteria into soil, allows quality control tests to be easily performed, and it reduces the need of monitoring the MICP process at the installation site. This also leads to cost savings.

Since the circulation network is part of the geosynthetic element, there is no need to have, for example, any drilling wells or other extensive drilling arrangements at the installation site. This results in a more flexible MICP application strategy.

If the geosynthetic element is implemented as a system of expandable fibres, then placing this system into soils with increased content in fines (such as silts and clays) creates the necessary porosity for circulating reactants and inducing MICP under low pressures.

According to a second aspect of the invention, there is provided a method of inducing microbiologically induced calcium carbonate precipitation in a geomaterial by using a geosynthetic element for carrying bacteria and a reactant in a flow network comprising openings on the surface of the flow network to allow the reactant to escape the flow network to the surrounding geomaterial along the flow network, the flow network further comprising a set of inlets for feeding the reactant into the flow network, and a set of outlets for feeding out at least a portion of the reactant from the flow network, the method comprising:

introducing the bacteria to the geosynthetic element in predetermined locations such that the bacteria are arranged to propagate from the geosynthetic element to the surrounding geomaterial;

placing the geosynthetic element to an installation location of the geosynthetic element to come in contact with the geomaterial; and feeding the reactant into the flow network through the set of inlets to allow the reactant to be circulated in the flow network and to allow at least a portion of the reactant and the bacteria to be propagated from the geosynthetic element to the geomaterial to produce solid calcium carbonate in the geomaterial.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which.

DETAILED DESCRIPTION OF EMBODIMENTS OF THE INVENTION

Some embodiments of the present invention will now be described in detail with reference to the attached figures. Identical or corresponding functional and structural elements that appear in the different drawings are assigned the same reference numerals.

The present invention describes new geosynthetic elements and their application methods for the implementation of MICP as a means of improving the stability and/or mechanical properties of geomaterials, such as various types of soil, sand, gravel and rock, or their formations in subterranean works. The proposed new geosynthetic elements may comprise prefabricated composite lattice layers, fibre systems, prefabricated drains, etc., arranged to carry calcifying bacterial cells, such as Sporosarcina *Pasteurii*. The application of the MICP process by using the proposed new geosynthetic elements or products provides an alternative to the direct introduction (via infiltration, via systems of pumping and extraction wells, or via direct mixing with aggregates) of ureolytic, calcifying bacteria into soils or other geological formations. The application of the MICP process by using the proposed geosynthetic elements aims, for example, to increase the load-bearing capacity of geomaterials, stabilise slopes, consolidate geomaterials, restore weak foundations, protect soils against erosion and/or improve their resistance against liquefaction.

Figure 1:
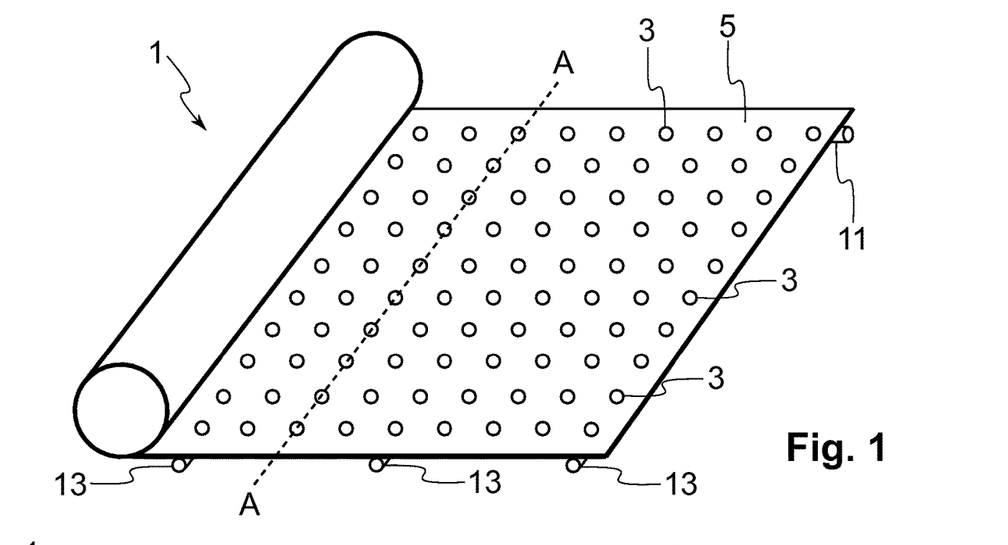
FIG. 1 schematically illustrates a geomembrane in a perspective view according to a first embodiment of the present invention.
Figure 2:
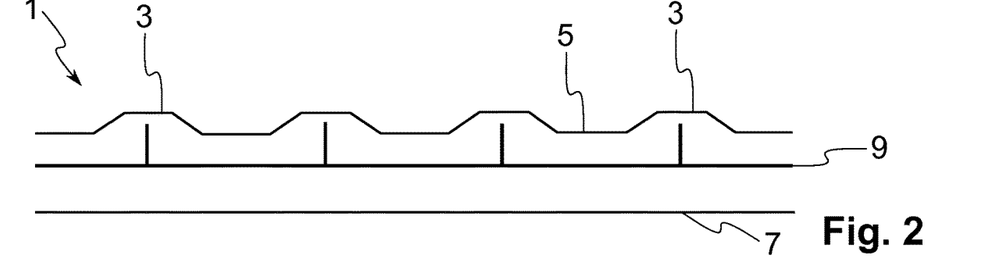
FIG. 2 is a partial cross-sectional view of the geomembrane of FIG. 1.

FIGS. 1 and 2 schematically illustrate a geosynthetic element 1 according to the first embodiment of the present invention. FIG. 1 is a schematic perspective view, whereas FIG. 2 is a partial cross-sectional view taken along the line A-A of FIG. 1 but not showing the cross-section along the whole length of the line A-A. According to this embodiment, the geosynthetic element 1 is a geomembrane 1, which when folded forms a roll, and when unfolded forms a mat-type substantially flat element which can be emplaced either horizontally or on inclined planes. The geomembrane 1 in this example comprises a set of hollow capsules, cavities or carriers 3 for receiving or accommodating calcifying bacterial cells, referred to simply as bacteria, in various forms as explained later. In this example, the capsules 3 are arranged in multiple, substantially parallel rows to form a carrier network for the bacteria. However, various other ways of arranging the capsules 3 are possible. In this example, the capsules 3 are arranged to protrude from an otherwise flat first surface 5 of the membrane 1, referred to as a top surface. In this illustrated example, the capsules 3 protrude only form the top surface 5 of the membrane but in another solution, they could protrude also from a second surface 7, referred to as a bottom surface, in this manner fully traversing the cross-sectional width of the membrane 1. However, instead of traversing the membrane 1, there could be a first set of capsules 3 on the top surface 5 and a second set of capsules 3 on the bottom surface 7. The capsules 3 may be permeable, biodegradable or soluble (water-soluble) or comprise a sieve to allow the bacteria to be dispersed to the surrounding environment. The capsules 3 are designed for the emplacement of lyophilized (freeze-dried) bacterial cells, bacterial spores or vegetative bacterial cells (in liquid medium). If the capsules comprise a sieve or another similar element, then the capsules 3 may be made of the same composite plastic material as the remaining membrane.

The bacterial cells, comprising the urease enzyme, are encapsulated in predetermined positions in the geosynthetic carrier network. In this example, encapsulation takes place in two steps as explained below:

(a) Growth of bacterial cultures and lyophilisation: vegetative cells are grown under sterile conditions in liquid nutrient medium and harvested at a desired biomass concentration. Harvesting refers to centrifuging the liquid culture, removing the supernatant and collecting the pellet. The pellet is resuspended in a medium comprising preferably deionised water and 10% sucrose or any additional element to fix the ionic strength of the solution. After resuspension, the pellet is frozen at −80° C. Subsequently, it is lyophilised to obtain the freeze-dried cells. The resuspended pellet is preferably emplaced in prefabricated holders prior to freezing at −80° C. in order to obtain ultimately a freeze-dried bacterial culture in the desired shape corresponding to the shape of the capsules or holders in the geosynthetic element 1.

(b) Emplacement of freeze-dried cells: the bacterial cells are emplaced in the capsules 3 composed of the same material as the geosynthetic membrane 1 or other biodegradable or water-soluble material, in predetermined positions in the grid, prior to installation. The final mass and positions of the encapsulated dry cells are determined based on the foreseen geotechnical application, the type of the geomaterial at the installation site, as well as the desired quantity of the microbe cement.

The membrane 1 also comprises a reactant circulation network or a flow network for circulating a reactant solution or medium, referred to simply as a reactant, and optionally additional bacteria depending on the adopted MICP strategy. The circulation network can be embedded in the membrane as shown in FIG. 2 or it could be placed for instance on the top and/or bottom surface 5, 7 of the membrane. Thus, in the example of FIGS. 1 and 2, the circulation network runs substantially parallel with the top and bottom surfaces 5, 7, and between them. Furthermore, in this example the circulation network is connected to the capsules 3 through openings in the circulation network in such a manner that the reactant and, optionally, the additional bacteria escape the circulation network to the surrounding environment through the capsules 3. It is to be noted that when the reactant escapes the circulation network through the capsules, it drifts simultaneously the bacterial cells. Once the bacteria come in contact with the reactant, microbe cement is formed to stabilise the geomaterial around the geosynthetic element 1. In the example shown in FIG. 2, the circulation network runs through the capsules 3. The circulation network may comprise conduits or tubes 9. The largest cross-sectional dimension (e.g. diameter if the cross-section is of circular shape) may be between 1 cm and 0.1 mm. However, in certain applications the largest cross-sectional dimension may be larger, for example up to 10 cm.

The membrane further comprises a set of inlets 11 and a set of outlets 13 for the circulation network. In the example of FIG. 1, only one inlet 11 is shown and three outlets 13. The reactant and optionally the additional bacteria are introduced into the circulation network through the set of inlets 11, while at least a portion of the reactant is arranged to exit the circulation network through the set of outlets 13 to be reused if necessary. The set of inlets 11 are at first endpoints of the circulation network, while the set of outlets 13 are at second, different endpoints of the circulation network. The circulation network may be partially or substantially fully filled with the reactant prior to, or after having placed the membrane into or onto the geomaterial.

Circulation of the reactant solutions in the embedded flow network results in the diffusion of the cells from the capsules 3 to the surrounding geomaterial. Based on the design of the MICP process, it is possible to further supply the circulation network with additional volumes of reactant media including vegetative calcifying cells. The reactant may comprise combinations of dissolved urea and/or dissolved calcium in water, or other elements, such as ammonium chloride. For example, the reactant may include equimolar concentrations of calcium chloride and urea. The circulation network may be filled with the reactant by a continuous flow through the circulation network. Alternatively, circulation of reactants occurs via batch flows of fixed or varying time intervals through the circulation network. It is also possible that reactant flow directions are different between consecutive neighbouring layers of membranes 1 or between consecutive rows of tubes 9 within one single layer. Furthermore, it is possible to select and dynamically vary the number of active inlets and/or outputs. The exact flow regime applied through the embedded network is to be chosen based on the desired MICP strategy. It is to be noted that the above description about the reactant solution and its flow configuration also applies to the embodiments explained below.

Figure 3:
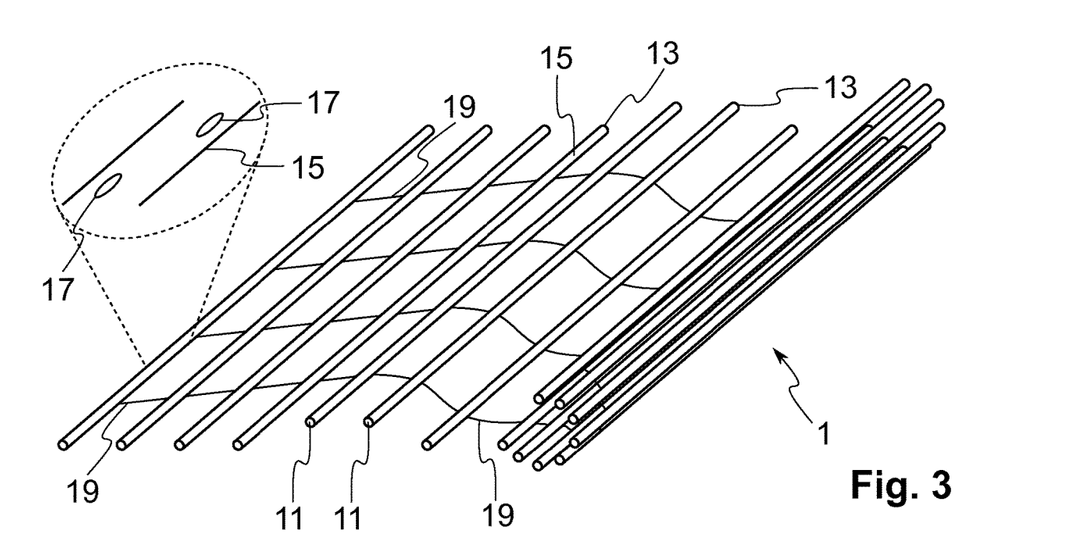
FIG. 3 schematically illustrates a geogrid in a perspective view according to a second embodiment of the present invention.

FIG. 3 schematically illustrates the second embodiment of the present invention. In this example, the geosynthetic element 1 is a geogrid or lattice, which can be rolled and unrolled similar to the membrane of the first embodiment. The geogrid 1 comprises a set of rods 15 or tubes, which in this example are arranged substantially parallel to each other. The rods 15 may be plastic composites, and all or only some of them are hollow to carry the bacteria and to allow the reactant to pass through the rods 15. In other words, the rods 15 are arranged to receive both the bacteria and the reactant. The rods also provide additional structural integrity to soils. Some of the rods 15 may be solid and non-hollow to increase the strength of the geogrid 1. A first end of the rod 15 may form the inlet 11, while a second end of the rod 15 may form the outlet 13. The rods 15 comprise openings, holes, orifices, cuts or slits 17 on their surface to allow for the diffusion of the bacterial cells and reactant solution to the surrounding environment. The openings 17 may be distributed around the periphery of the rods evenly or unevenly and lengthwise along the rods 15 (the circulation network). The size and/or location of the openings depend(s) again on the chosen manner for applying the MICP process and/or on the environment. As can be seen in FIG. 3, the rods 15 are connected to each other with connecting elements 19, which in this example are metallic or plastic fibres. These fibres further increase the strength and stability of the composite geogrid 1.

Figure 4:
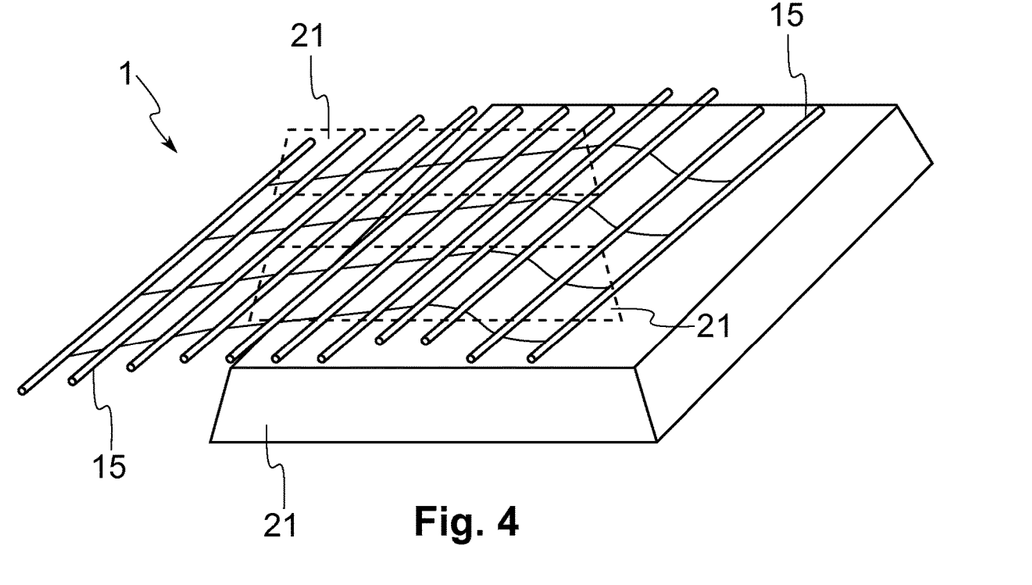
FIG. 4 schematically illustrates the geogrid of FIG. 3 in a perspective view in an example application.

FIG. 4 schematically shows the geogrid 1 when used for a construction of an embankment. In this case the geogrid 1 together with the applied MICP process mitigate liquefaction risk, for example. Embankments are constructed in soil layers 21 with geosynthetic elements often placed between them for increasing their overall stability. In other words, the geogrids 1 of FIG. 3 may be placed in multiple horizontal layers with their vertical spacing determined according to the design. For simplicity, only one geogrid layer is shown in FIG. 4. In FIG. 4, the width of the geogrid 1 exceeds the width of the embankment in order to allow the geogrid tip to fold upwards following the slope of the embankment and then backwards to entrap soil for increased stability. Once the geogrids 1 are placed between the soil layers 21, the MICP process is applied by using the network of hollow rods 15 incorporated in the geogrid 1. Embankments are typically built in transportation works (roads, railways, etc.)

and are susceptible to liquefaction hazard in seismic zones. Application of the MICP results in the nucleation and growth of microbe cement particles, which endow soil with the necessary cohesion to prevent liquefaction. The main advantage of the proposed design method is that the network of rods or tubes 15 can be activated in multiple, alternative ways during or after the construction of the embankment (should rehabilitation works be needed). As an example, individual rods 15 of the same geogrid layer can be used alternatively as injection and extraction tubes for the reactant. Furthermore, a given individual geogrid layer can be used as an injection source, while the ones above and below it act as extraction sources, and vice versa. Thus, this design method offers flexibility in the application of MICP and ensures homogeneity of precipitated microbe cement.

Figures 5A, 5B:
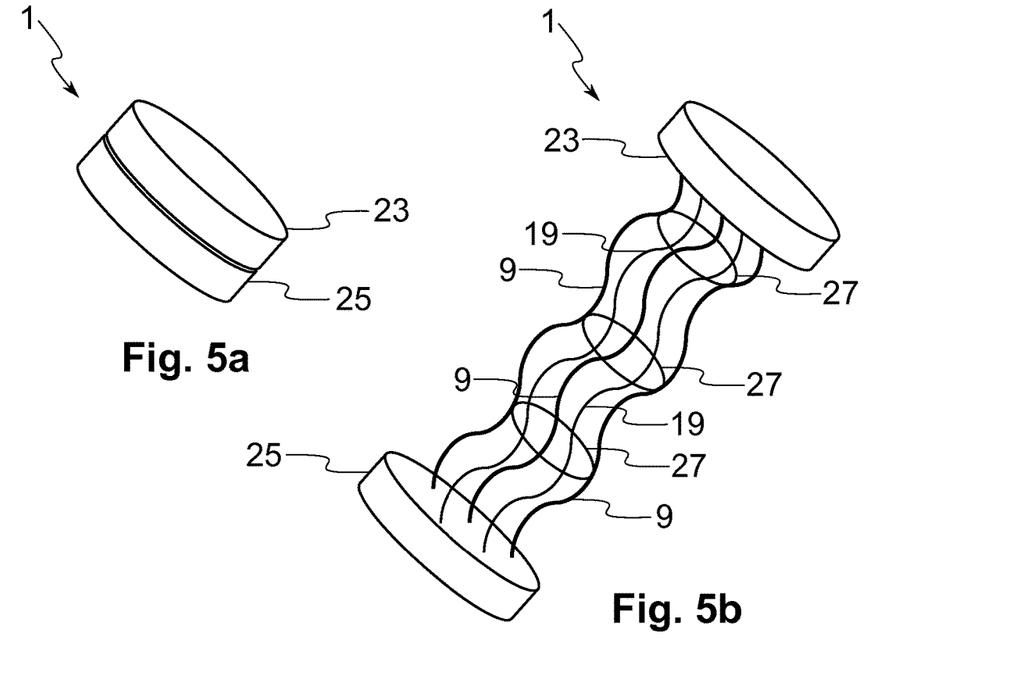
FIGS. 5a and 5b schematically illustrate a system of expandable microfibres in perspective views according to a third embodiment of the present invention.

FIGS. 5a and 5b illustrate a geosynthetic element 1 according to the third embodiment of the present invention. In this embodiment, the geosynthetic element 1 is a system of expandable or extensible microfibres. The system comprises a set of plastic microfibres 19 placed between a first plate or cap 23 and a second plate or cap 25 in an extended state of the system as shown in FIG. 5b. These two plates 23, 25 can be separated from each other. FIG. 5a shows the system in a closed or retracted state, while FIG. 5b shows the system in an open or extended state. In this example, the system comprises expandable microfibres 19, which may be coated in bacterial resin for the application of the MICP via drilling as explained later. The coating may be a dissolvable bacterial resin coating, such as hydrogel resin. The coating would comprise lyophilised (freeze-dried) bacterial cells, which once the coating has been dissolved, could come in contact with the reactant. Upon separation of the first and second plates 23, 25, the fibres unfold from down to top with the help of an auger, or other similar drilling mechanism. The microfibres 19 not only provide additional integrity to the geomaterial but ensure that: (i) the bacterial cells are distributed along the drilling path and (ii) enough airspace is generated during drilling for applying the MICP process to soils with increased content in fines. In this example, the system further comprises a network of microtubes 9 for receiving the reactant solution and optionally the bacteria to allow the drilling bore to be filled with the reactant solution. Furthermore, microfibre rings 27 may be provided to add additional integrity to the system. The first and second end plates 23, 25 are hollow to accommodate the fibres 19, the tubes 9 and the rings 27 in the closed state of the system. The first and/or second plates 23, 25 may also receive a solution rich in vegetative bacteria so that the fibres 19, the tubes 9 and/or the rings 27 can be impregnated in calcifying bacteria. When these elements unfold, they would still keep at least some of the bacteria on their surfaces and when these bacteria come in contact with the reactant, the microbe cement is formed.

Figure 6A:
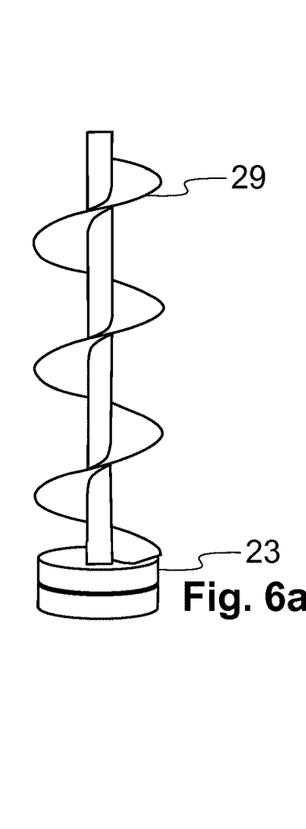
FIGS. 6a to 6d schematically illustrate a process of inserting the system of expandable microfibres of FIGS. 5a and 5b into soil.
Figure 6B:
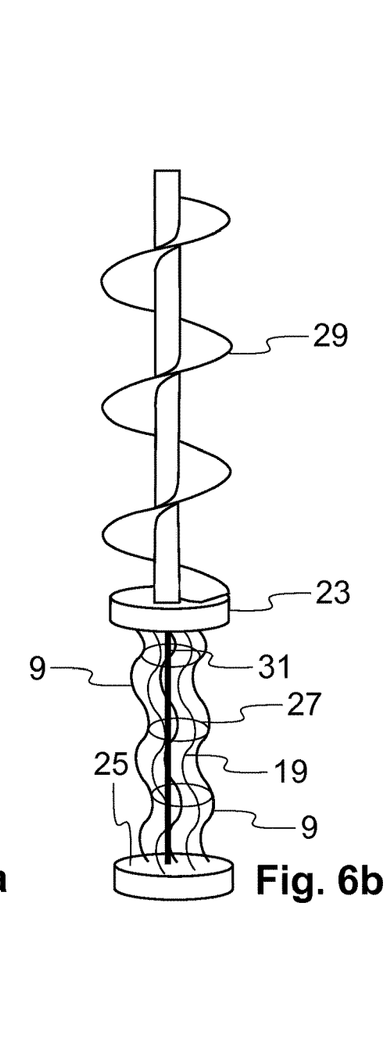
Figure 6C:
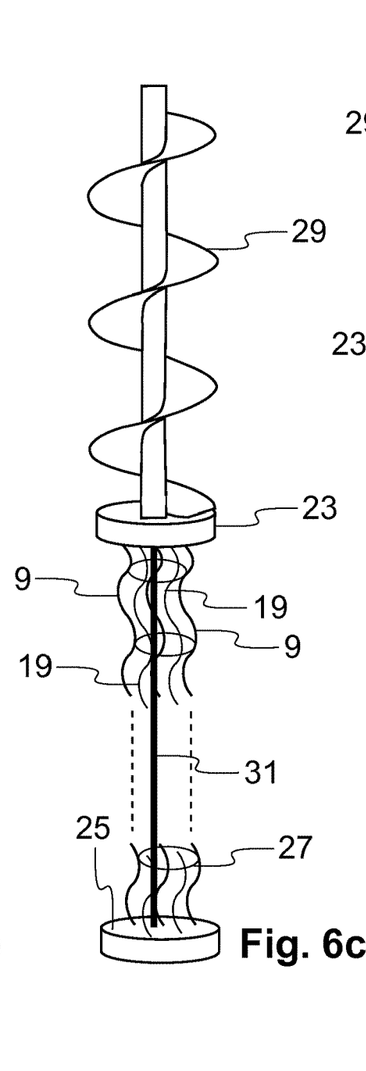
Figure 6D:
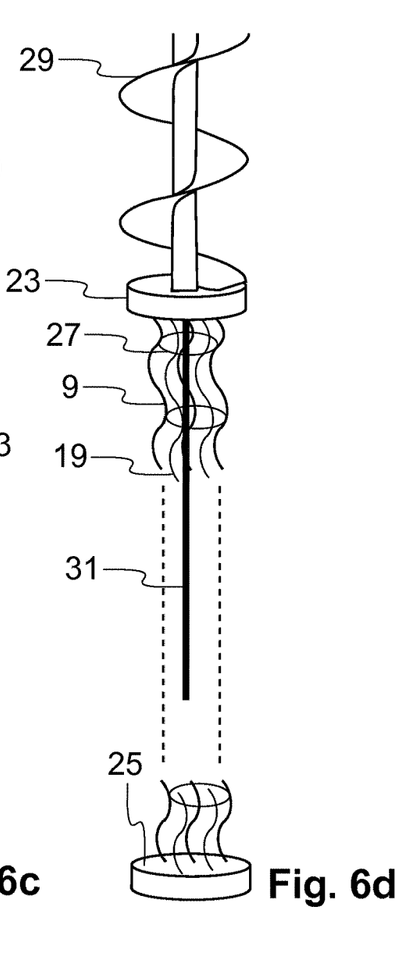

FIGS. 6a to 6d illustrate the process of applying the system of expandable plastic microfibres 1 into the soil via drilling and down to top unfolding of the system for inducing the MICP at targeted depths. Drilling in this example is carried out by an auger 29, which has a modified tip to incorporate the separable plates 23, 25. The two plates 23, 25 are protected at the auger's tip. Once the desired depth is reached (as shown in FIG. 6a), the auger 29 moves upwards (FIGS. 6b and 6c) and a fixing rod 31 extends or stretches out in order to keep the first plate (bottom plate) 23 fixed at the desired depth, while the second plate (upper plate) 25 moves upwards following the auger's tip. Upon unfolding, the microfibres 19 are mixed with the surrounding geomaterial. The dashed lines in FIGS. 6c and 6d indicate that the total length of the fibres 19 incorporated in the system is determined by the desired depth, the type of the geomaterial and/or the nature of the foreseen application. Once the system of microfibres 1 has been sufficiently unfolded (FIG. 6d), the upper plate 25 can be recovered and reused. The rod 31 used for fixing the bottom 23 may comprise a conduit for the circulation of the reactant solution for inducing the MICP in the vicinity of the microfibres 19. For this purpose, the conduit and the rod 31 comprise openings on their surfaces to allow the reactant to escape the conduit and the rod 31. The microtubes 19 may also be used for circulating and spreading the reactant solution. The advantage of this kind of application is that the bacterial cells can be placed into the soil during drilling (by e.g. having the resin coating on the fibres 19 and/or by the impregnation approach) and their presence ensures precipitation of microbe cement along the drilling path. Furthermore, air space is generated during the drilling and installation of the microfibre system 1. This allows the application of the MICP to be extended to soils with increased content of fines.

Figure 7:
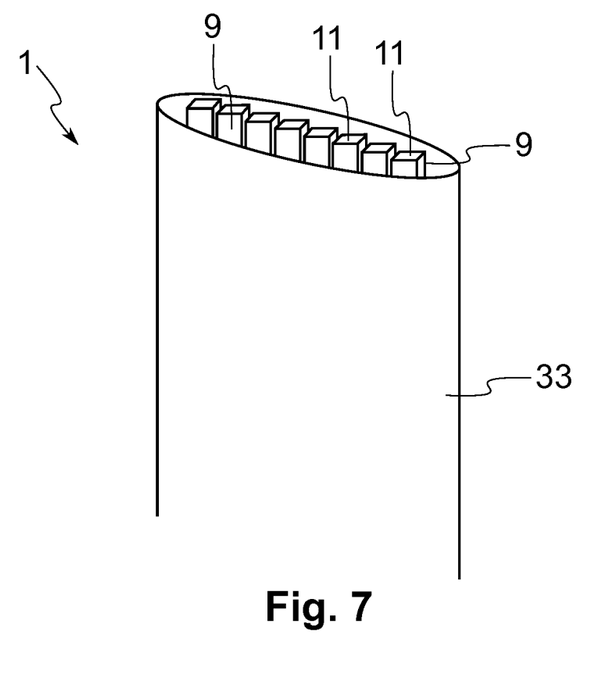
FIG. 7 schematically illustrates a geosynthetic drain in a perspective view according to a fourth embodiment of the present invention.

FIG. 7 illustrates the geosynthetic element 1 according to the fourth embodiment of the present invention. In this embodiment, the geosynthetic element 1 is a prefabricated drain that can be placed in the geomaterial. In FIG. 7, only one end of the drain 1 is shown. These drains 1 may be many metres long. A given number of drains are typically placed substantially vertically within a given area, where the number depends for example on the soil composition. As can be seen in FIG. 7, the drain 1 comprises a set of microtubes 9 surrounded by an outer cloth 33 or sleeve, which in this example is permeable. In this example, the microtubes have a rectangular cross-section. However, other shapes, such as circular, would be equally possible. Water or other reactant media are arranged to run through the set of microtubes 9 and/or the outer cloth 33 to lead the water from the surface into a subterranean soil formation. The microtubes 9 are arranged to receive and hold the calcifying bacteria, and they are also used to circulate the reactant solution. Openings on their periphery make it possible to diffuse the bacteria and the reactant solution to the surrounding environment. Thus, the microtubes 9 form the encapsulation carriers and subsequently the reactant circulation network. The drain 1 may also comprise solid rods (which may or may not be hollow) running for example next to the tubes 9 to increase the strength of the drain 1.

As explained above, FIGS. 1 to 4 illustrate new designs of the composite layers of the geosynthetic element 1 with the provision of embedded circulation networks and that of predetermined positions for bacterial encapsulation for direct application to geomaterials. FIGS. 5a and 5b show a new design of the system of expandable microfibres 1, while FIG. 7 illustrates a new design for the prefabricated drain 1. In all these designs, the geosynthetic elements 1 comprise the bacteria (at least before circulating the reactant) and the circulation network in addition to some (other) structural elements. The advantage of such designs is the incorporation of the circulation networks and the capsules 3 or carriers of the calcifying cells in predetermined positions. This ensures homogenous distribution of calcifying biomass upon emplacement at the installation site. The bacterial cells do not have to travel long distances from a fixed injection source since their position is predetermined as a result of the encapsulation for example in the composite body. As mentioned, the capsules 3 may be soluble or biodegradable or made of the same composite material as the remaining geosynthetic element 1 but comprising a sieve, for example, to allow homogenous spreading of the bacterial cells to the surrounding environment. The network of the microtubes 9 or the rods 15 is used for directly applying the MICP, targeting increased adhesion between the composite layers and geomaterials and increased overall strength and stiffness of the surrounding volume. Another advantage of the invention is that the proposed geosynthetic elements 1 are lightweight, and can be easily transported and unrolled or unfolded at the installation site. Furthermore, similar products, however without the provision of the encapsulated calcifying bacteria or that of the flow networks, are produced and used in traditional geosynthetic applications. Thus, there exists an established know-how around their fabrication and installation, done either by emplacement between layers of soil, or by direct application inside bores via drilling and/or mixing.

While the invention has been illustrated and described in detail in the drawings and foregoing description, such illustration and description are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims. The teachings of different embodiments may be combined to obtain further embodiments. For instance, the explained reactant flow process explained in connection with the first embodiment may be applied to the other embodiments as well. A further variant of the present invention may be easily obtained e.g. from the first embodiment by removing the continuous bottom and top surfaces. According to this variant, the circulation network would be directly exposed to the surrounding geomaterial. The manner of arranging the circulation network (e.g. how close the tubes of the circulation network run to each other and at which angle) would define how the resulting geosynthetic matrix or lattice would look like. The resulting matrix could look like a combination of interconnected triangles (or rectangles or other shapes), where the triangle edges would be formed by the tubes of the circulation network, and the area inside the triangle edges would be empty or occupied by the geomaterial once the matrix has been installed.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A geosynthetic element for a geotechnical engineering application for forming solid calcium carbonate in a soil material, the geosynthetic element comprising:
    bacteria carriers comprising calcifying bacteria, the calcifying bacteria being arranged to propagate from the bacteria carriers to a surrounding soil material; and
    a flow network comprising openings on the surface of the flow network to allow a reactant to propagate from the flow network to the surrounding soil material along the flow network to produce solid calcium carbonate, the flow network further comprising a set of inlets for feeding the reactant into the flow network, and a set of outlets for feeding out at least a portion of the reactant from the flow network.

2. The geosynthetic element according to claim 1, wherein the geosynthetic element comprises at least one of the following: a membrane, a grid, a drain and a system of expandable tubes.

3. The geosynthetic element according to claim 2, wherein the membrane is a rollable mat with no holes through the mat.

4. The geosynthetic element according to claim 1, wherein the bacteria carriers comprise cavities for receiving the calcifying bacteria, and wherein the cavities are connected to the flow network.

5. The geosynthetic element according to claim 4, wherein the cavities comprise a biodegradable layer, a sieve-like element, a soluble membrane or a combination thereof to allow the calcifying bacteria and the reactant to escape the cavities.

6. The geosynthetic element according to claim 1, wherein the flow network comprises a set of tubes, the tubes being connected to each other with connecting elements.

7. The geosynthetic element according to claim 6, wherein the tubes are arranged to receive the calcifying bacteria and the reactant, and wherein the calcifying bacteria and the reactant are arranged to escape the tubes through the openings.

8. The geosynthetic element according to claim 1, wherein the geosynthetic element comprises a first end plate and a second end plate for connecting expandable fibres to them and for allowing the fibres to longitudinally expand between the first and second end plates when separated from each other.

9. The geosynthetic element according to claim 8, wherein the flow network comprises expandable tubes between the first and second end plates, the expandable tubes comprising the openings.

10. The geosynthetic element according to claim 8, wherein the expandable fibres comprise a bacterial resin coating.

11. The geosynthetic element according to claim 1, wherein the flow network comprises a set of substantially parallel running tubes, and wherein a sleeve is arranged around the set of tubes.

12. A method of inducing microbiologically induced calcium carbonate precipitation in a geomaterial by using a geosynthetic element for carrying bacteria and a reactant in a flow network comprising openings on the surface of the flow network to allow the reactant to escape the flow network to the surrounding geomaterial along the flow network, the flow network further comprising a set of inlets for feeding the reactant into the flow network, and a set of outlets for feeding out at least a portion of the reactant from the flow network, the method comprising:
    introducing the bacteria to the geosynthetic element in predetermined locations such that the bacteria are arranged to propagate from the geosynthetic element to the surrounding geomaterial;
    placing the geosynthetic element to an installation location of the geosynthetic element to come in contact with the geomaterial; and
    feeding the reactant into the flow network through the set of inlets to allow the reactant to be circulated in the flow network and to allow at least a portion of the reactant and the bacteria to be propagated from the geosynthetic element to the geomaterial to produce solid calcium carbonate in the geomaterial.

13. The method according to claim 12, wherein the method further comprises feeding additional bacteria into the flow network through the set of inlets.

14. The method according to claim 12, wherein the reactant is fed into the flow network by using batch flows of fixed or varying intervals, or by a continuous reactant flow.

15. The method according to claim 12, wherein the bacteria are at least one of the following: lyophilised bacterial cells, vegetative bacterial cells, bacterial spores and a bacterial resin coating.

* * * * *